E. H. SEARLE.
FIREARM.
APPLICATION FILED MAY 21, 1909.
985,847.
Patented Mar. 7, 1911.
7 SHEETS—SHEET 6.
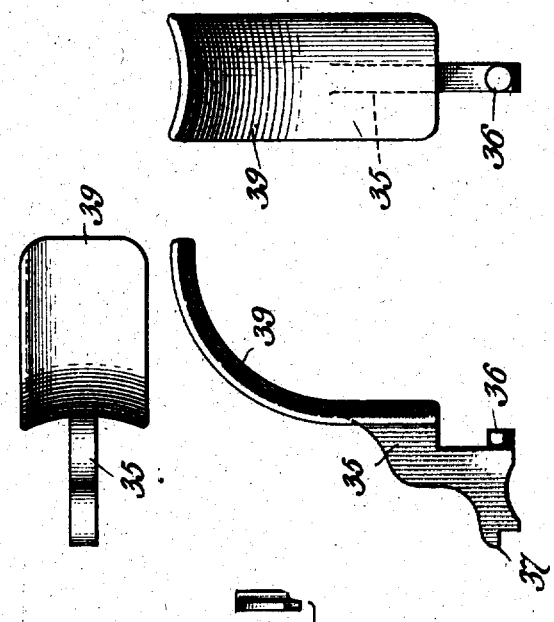
WITNESSES
J. M. Wynkoop
H. N. Byrne
INVENTOR
Elbert H. Searle.
By Knight Bros. Attorneys

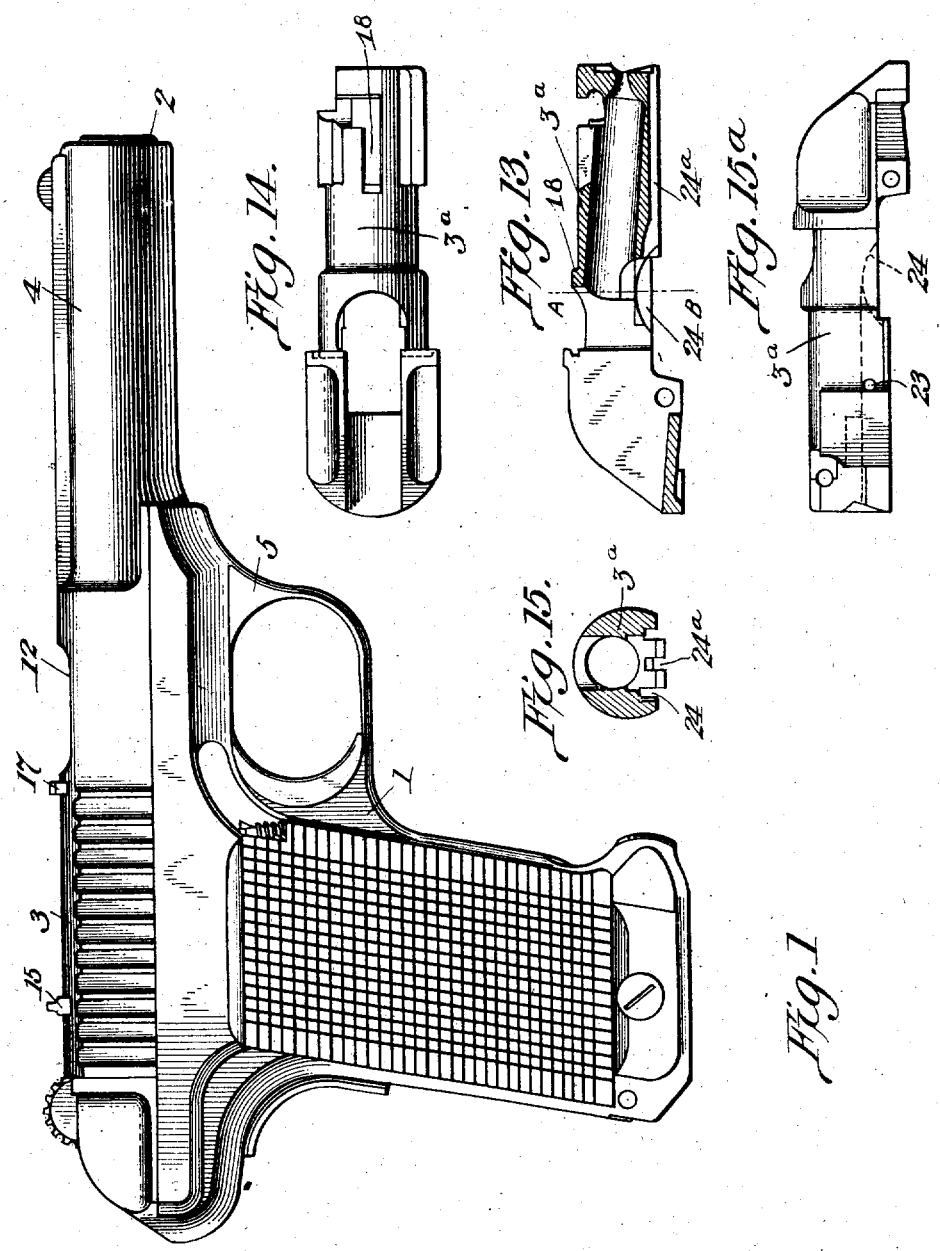

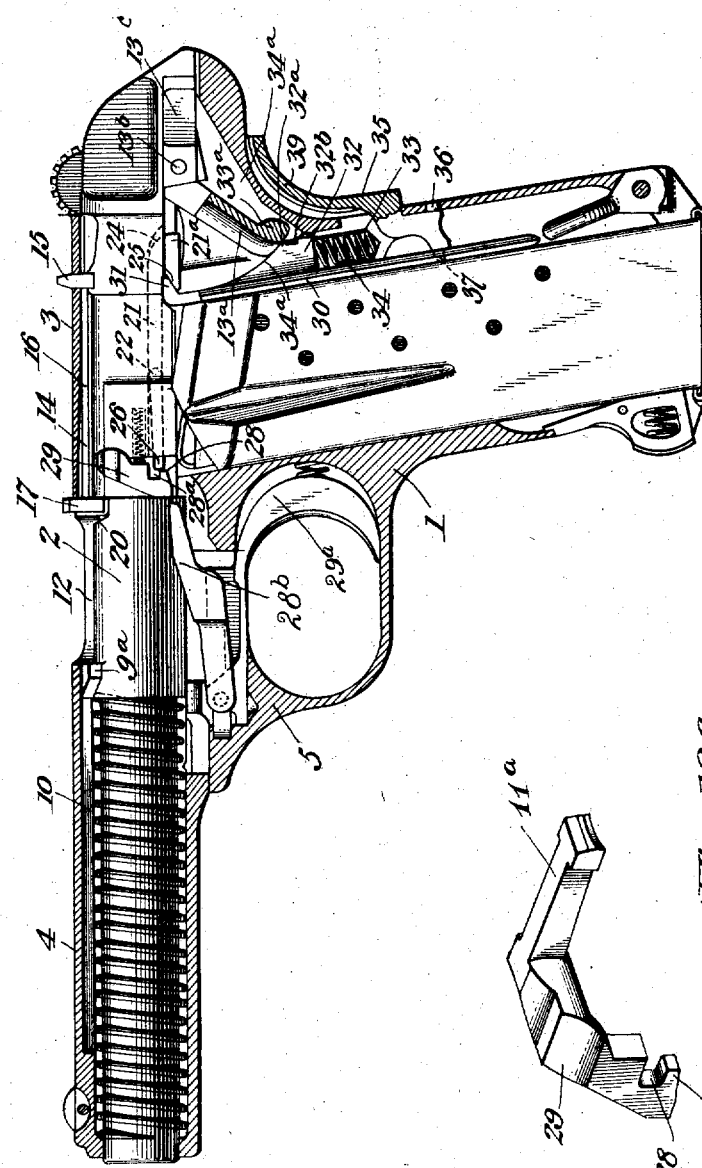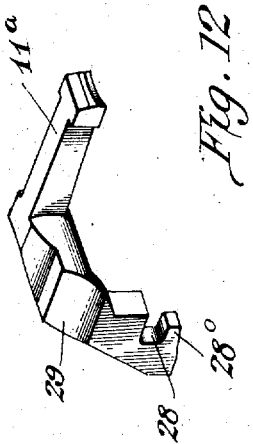

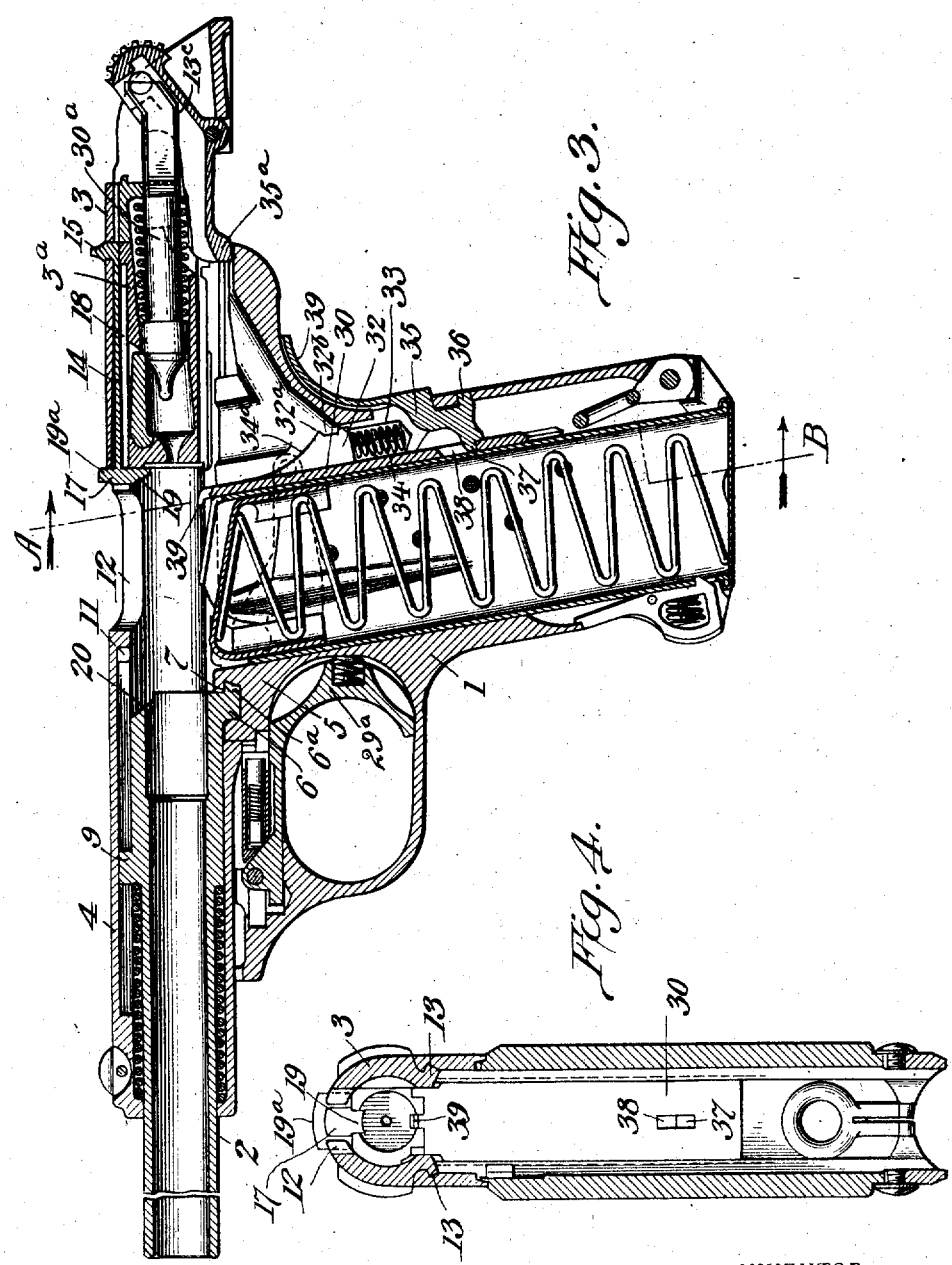

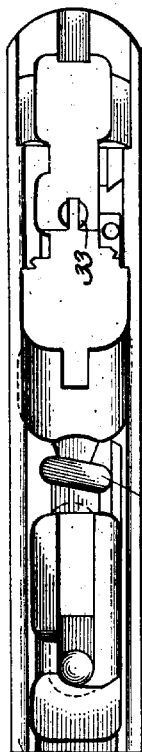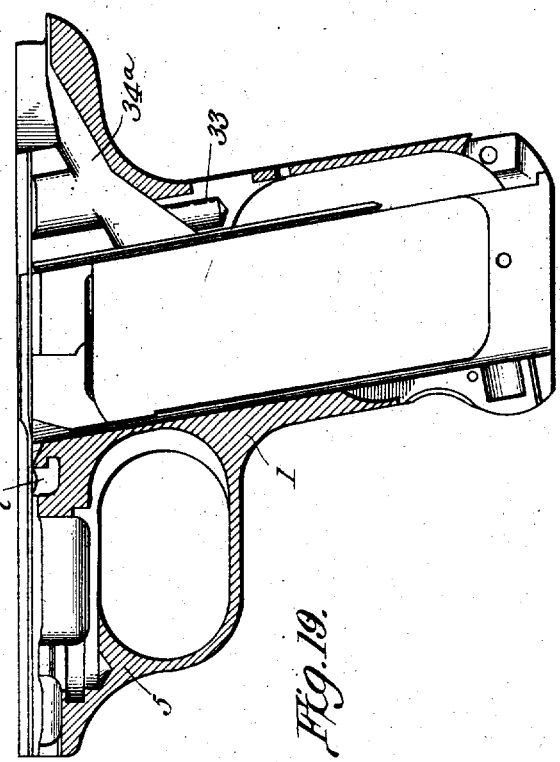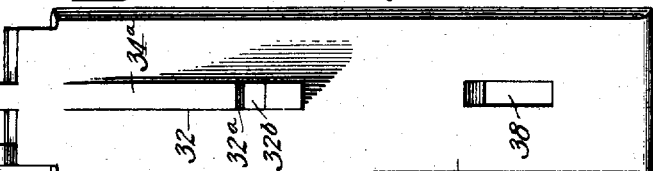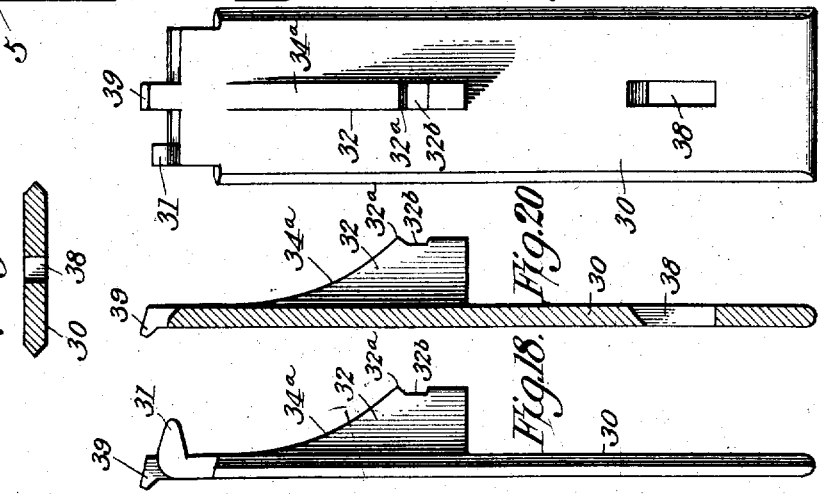

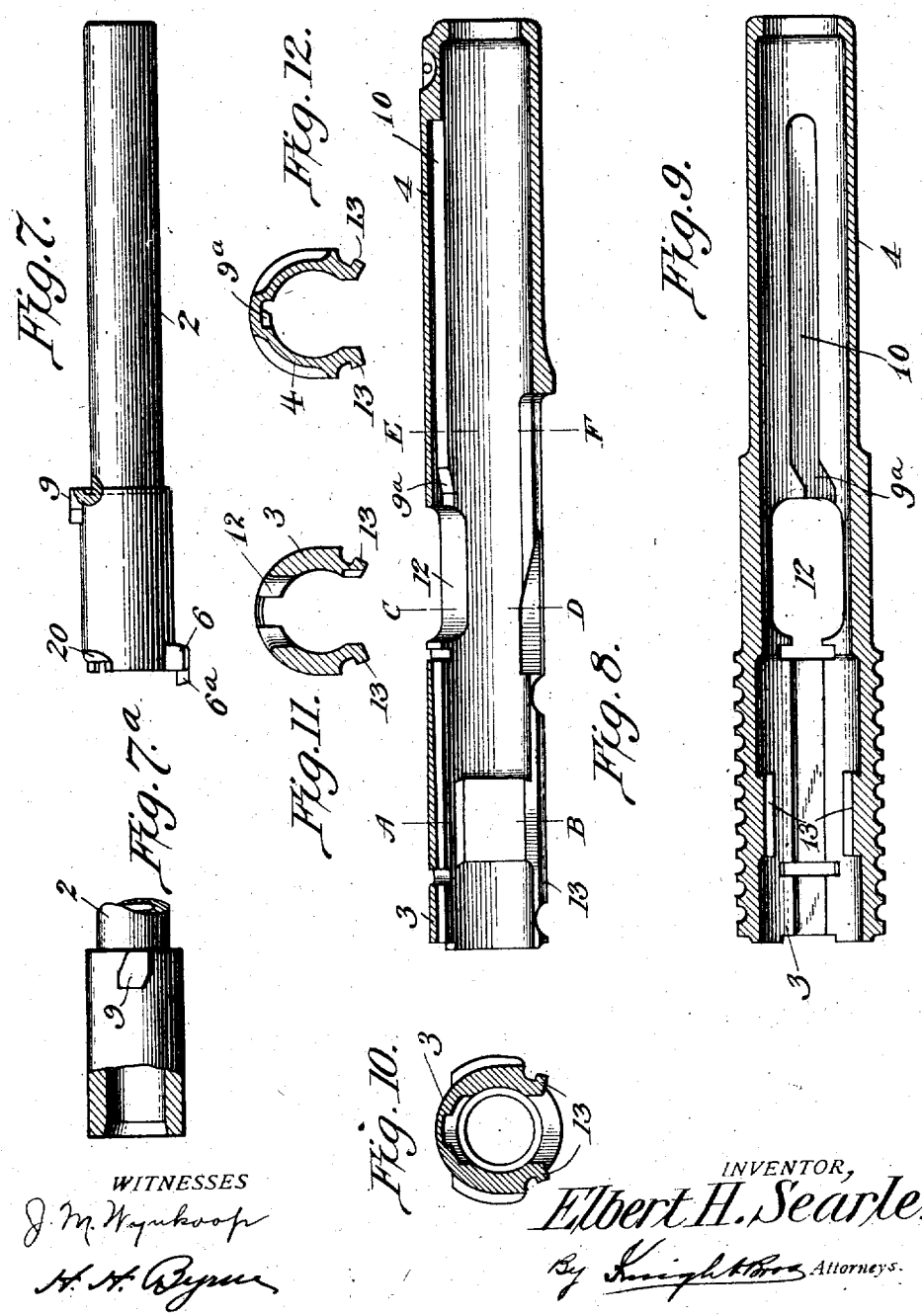

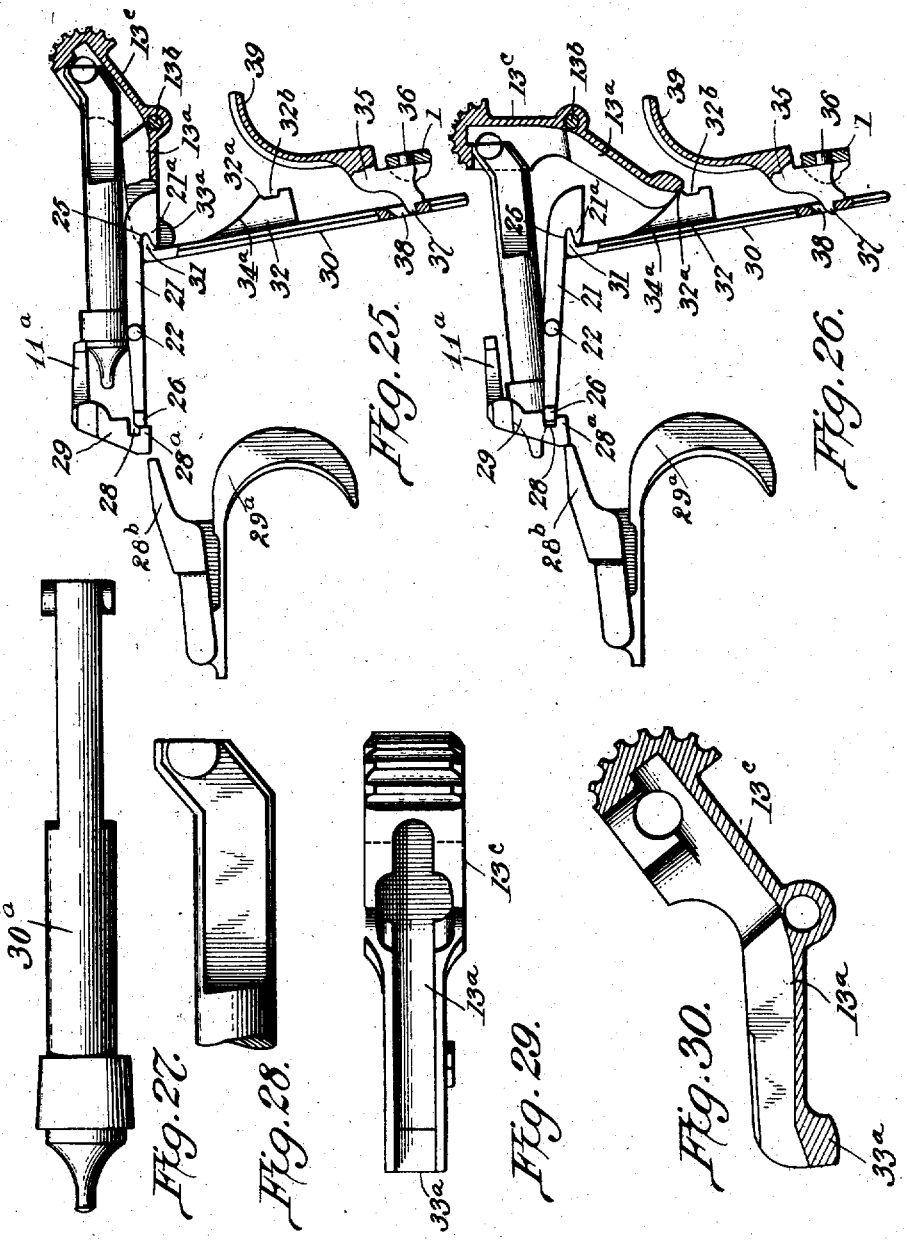

UNITED STATES PATENT OFFICE.

ELBERT HAMILTON SEARLE, OF SPRINGFIELD, MASSACHUSETTS, ASSIGNOR OF THREE-FOURTHS TO WILLIAM D. CONDIT, OF DES MOINES, IOWA.

FIREARM.

985,847.      Specification of Letters Patent.      Patented Mar. 7, 1911.

Application filed May 21, 1909. Serial No. 497,483.

*To all whom it may concern:*

Be it known that I, ELBERT H. SEARLE, a citizen of the United States, residing at Springfield, in the county of Hampden and State of Massachusetts, have invented certain new and useful Improvements in Firearms, of which the following is a specification.

This invention relates to automatic breech loading fire arms of that type disclosed in my Patent No. 804,985, dated November 21, 1905 and in my co-pending application embodying improvements thereon, Serial No. 370,338, dated April 25, 1907. These types of gun are distinguished in that the inertia of the projectile, or its resistance to rotation by the rifling in its passage through the barrel, is utilized to withhold the breech bolt from recoil until the projectile has left the barrel when through the residual gases in the barrel the recoil of the breech bolt occurs and automatically operates means for expelling the spent cartridges, charging, and cocking the gun.

My present invention relates to further improvements in certain details of the gun mechanism adapted to meet the particular needs required of special service wherein the gun is used. To these ends novel means are provided for the ejection of the spent cartridges at the top of the gun; and to accomplish which, the means for holding the barrel against rotation is disposed forwardly of the shell ejector opening; the shell extractor determines by its position whether or not the piece is loaded, and with the rear sighting piece with which it is connected, provides means for holding the breech plug in position. And a further improvement is in providing means on the gun handle for controlling the sear locking means, which controlling means is normally effected and is adapted to be automatically released when the gun is gripped for firing. The sear controlling means further provides a lock to prevent accidental cocking of the firing pin.

The present invention is further distinct in that the device which anchors the barrel to the gun frame affords a means which causes counter-recoiling movement in the gun barrel when rotating to unlock.

With these as the essentials, my invention embodies further improvements that will be indicated in the course of the following description, set forth in the claims, and illustrated in the accompanying drawings, wherein is shown the invention in its preferred structure.

In the several views, Figure 1 is a right side elevation of the gun. Fig. 2 is a left side elevation showing frame and breech bolt in section. Fig. 3 is a central longitudinal section. Fig. 4 is a cross section on the line A B of Fig. 3. Fig. 5 is a detail section of the frame. Fig. 6 is a top plan view of the frame. Fig. 7 is a right side elevation of the barrel. Fig. 7ª is a top plan and sectional view of a part of the barrel shown in Fig. 7. Fig. 8 is a longitudinal section of the breech bolt. Fig. 9 is a top plan sectional view thereof. Fig. 10 is a transverse section of Fig. 8 taken on the line A B. Fig. 11 is a similar view of the same figure taken on the line C D. Fig. 12 is a like view on the line E F. Fig. 12ª is a perspective view of the sear. Fig. 13 is a longitudinal section of the breech bolt plug. Fig. 14 is a top plan view thereof. Fig. 15 is a transverse section of Fig. 13 taken on the line A B. Fig. 15ª is a left side elevation of Fig. 13. Fig. 16 is a side elevation of the sear lock. Fig. 17 is a top plan view thereof. Fig. 18 is a side elevation of the sear rock release. Fig. 19 is a front elevation thereof. Fig. 20 is a view in vertical section of Fig. 18. Fig. 21 is a cross sectional view of the sear release. Fig. 22 is a side elevation of the sear release controller. Fig. 23 is a rear view thereof. Fig. 24 is a top plan view of the same. Fig. 25 illustrates the arrangement of the firing mechanism, the sear, sear lock, and sear lock controller. Fig. 26 shows the position of these parts after firing. Fig. 27 is a detail view of the firing pin. Fig. 28 is a side elevation of a section thereof. Fig. 29 is a top plan view of the cocking lever; and Fig. 30 is a side elevation thereof.

Referring more in detail to the several figures, wherein like reference characters indicate corresponding parts in the different views shown, the numeral 1 indicates the frame of the gun, 2 the barrel therefor and 3 the breech bolt having the extended sleeve portion 4. The frame 1 has an extended portion 5 to which the barrel 2 is secured against recoil relative thereto, the securing means therefor comprises a recess 7 and an undercut portion formed in the frame extension 5, and a lug 6 with a shoulder 6ª formed on the barrel 2, said lug being formed integral with the barrel at its rear and under side. The lug 6 and recess 7 are disposed diagonally to the axis of the gun barrel, for a purpose to be hereinafter explained.

The breech bolt 3 is of substantially that structure disclosed in my application above referred to, and has the usual undercut portion and is provided with projecting members 13 adapted to slidingly fit within corresponding ways on the frame. (See Fig. 4.) The breech bolt has its shell ejection opening 12 disposed directly above the firing chamber, the purpose whereof is to adapt the gun to be used for company firing wherein the ejected shells will not interfere with whom ever may be next to the person firing the gun. The barrel 2 has a lug 9 formed thereon intermediate its ends and disposed in advance of the opening 12 of the breech bolt, said member 9 providing a cam surface coöperating with a similar surface $9^a$ and a slotted way 10 in the breech bolt extension 4 whereby to hold the breech bolt against rotary movement until the projectile has left the barrel whence it permits the recoil of the breech bolt in substantially that manner described in my co-pending application, and in the patent referred to. In its rotating movement to unlock the barrel is given a counter-recoiling movement by reason of the connection between the barrel and gun frame, viz. 6 and 7.

The structure of the trigger mechanism and its immediately associated parts is substantially that disclosed in my pending application and need not therefore be described here. The breech bolt plug $3^a$ is likewise of the structure shown in the pending case differing only in that it has on its upper surface and running substantially the length thereof a groove or slot 18 to accommodate the shell extractor and cartridge indicator 17. Said shell extractor and cartridge indicator 17 has connection with the rear sight 15 by a resilient member 14, which member has slight vertical movement within the groove 18. That end of the shell extractor 17 within the firing chamber has a beveled surface 19 adapted to contact with a complementary surface 20 on the rear end of the barrel whereby to provide a close and even fit when the breech is closed. The lower end of the piece 17 projects slightly into the recess provided for the flange on the cartridge shell and in such position engages the shell of the spent cartridge on the recoil of the breech and withdraws the same when it is ejected in a manner that will be obvious. The member 17 serves to indicate whether or not the piece is loaded by its relatively projecting position above the breech bolt; thus when a shell is in position said member 17 is engaged thereby and consequently projects farther beyond said breech bolt than when the chamber is empty in which latter case no obstacle is offered to the normal position of the extractor. The channel $24^a$ formed in the underside of the bolt plug $3^a$ provides the necessary clearance for the shell ejector 39.

The structure of the sear $11^a$ is substantially that shown in my guns heretofore mentioned excepting that the sear arm 29 has a recess 28 cut therein and a ledge $28^a$ which latter element coöperates with a member 26 on the sear lock 21 to hold the percussion pin in cocked position until the gun is gripped for firing.

The sear lock 21 has a stud 22 intermediate its ends and is pivotally mounted thereon within a bearing 24 formed within the under side of the breech bolt plug whereby said sear lock may be moved into and out of position to dog the sear. To effect this engagement the sear lock member 26 is adapted to move into and out of the recess 28, which movement it has when the gun is fired, but which normally lies in contact with the ledge $28^a$ and holds the sear arm 29 in that position shown in Fig. 2 thus preventing the sear from releasing the percussion pin $30^a$. The opposite or rear end of the sear lock 21 is designed with a depending portion $21^a$ undercut to provide a cam member 25 which cam coöperates with the sear lock controlling means that effects the release of the same when the gun is gripped for firing.

The safety lock or sear release controlling means comprises a plate or slide 30 mounted in an upright position in the frame 1 and immediately adjacent the magazine chamber in which position said slide is adapted to have slight vertical movement. At its upper end the slide 30 has a rearwardly disposed finger 31 adapted to enter into engagement with the cam surface 25 of the sear lock when the breech is closed and when such engagement is effected the lug 26 of the sear lock 21 engages with the ledge $28^a$ of the sear arm 29 and prevents movement of said arm at all times except when the gun is gripped for firing. To normally keep the safety slide 30 in contact with the sear lock 21 and hold said lock in effective position, said slide is provided with an integral and offstanding shoulder 32 against which seats a spiral spring 34 that lies within a chamber 33 on a fixed part of the gun frame.

For automatically releasing the sear lock, the gun has a gripping lever 35 fulcrumed on a pin 36 on the rear and uppermost portion of the gun handle which grip has a member 39 whose design is substantially that of the contour of the handle. At a point opposite its fulcrum the lever 35 has a latch member 37 engaging within the plate 30 of a slot 38 formed in said plate. The lever 35 when gripped by the hand will effect to displace the safety slide 30 against the tension of the spring 34 and in such movement will cause the sear lock 21 to turn upon its pivot 22 bringing the lug 26 into register with the slot 28 of the sear arm 29 thus permitting said arm to be moved by the release 28ᵇ when pressure is brought to bear on the trigger 29ᵃ.

To prevent accidental displacement of the breech bolt, i. e., any tendency to its moving into position for cocking, the safety slide 30 has an abutment 32ᵃ against which contacts the foot of the cocking lever 13ᶜ. Said abutment 32ᵃ has a recess 32ᵇ that seats within the lower edge of the channel 13ᵃ on the cocking lever. When the safety slide is depressed the abutment 32ᵃ clears the end of the cocking lever 13ᶜ and permits the latter to turn on its pivot 13ᵇ and ride upon the incline 34ᵃ. The upper end of the safety slide 30 carries the shell ejector, indicated by numeral 39 (see Figs. 3, 18, 19 and 20) said member being disposed directly in the path of the spent shell, as it is being withdrawn by the extractor 17.

Having thus described my invention the following I claim as new therein and desire to secure by Letters Patent:—

1. A gun comprising a barrel, a recoiling breech-member having an ejecting opening, and interengaging locking faces on said barrel and breech-member, disengaged by relative rotation between them to permit of recoiling of the breech-member, said interengaging faces being in line with, and forward of the ejection opening.

2. A gun comprising a non-recoiling barrel, a recoiling breech-member having an ejecting opening, and interengaging locking faces on said barrel and breech-member, disengaged by relative rotation between them to permit of recoiling of the breech-member, said ejecting opening being at top of the breech-member and said interengaging faces being in line with but forward of said ejecting opening.

3. A gun comprising a frame, a barrel having a rear end lug abutting the frame, and a breech-member having an open under side by which it engages the frame; said barrel and breech-member being provided respectively with a lug and a locking shoulder, interengaging to control relative longitudinal movement between them and located at a point removed from the open side of the breech-member and forward of the rear end lug.

4. In a recoil actuated gun, the combination of a frame, the barrel having a cartridge chamber and a bore, and a rear end lug by which it engages the frame, and a breech-member surrounding the barrel and having an ejecting opening and an open under side by which it is fitted to the frame; said barrel and breech-member being provided respectively with an integral locking lug and a shoulder, interengaging to lock the breech in closed position; said lug and shoulder being located on the diametrically opposite side from the under opening and rear-end lug and at a point forward of the ejecting opening.

5. In a recoil actuated gun, the combination of the frame, the barrel having a cartridge chamber and a bore, and a rear end lug by which it engages the frame, and a breech-member surrounding the barrel and having a top shell ejecting opening and an open under side by which it is fitted to the frame; said barrel and breech-member being provided respectively with an integral locking lug and a shoulder, interengaging to lock the breech in closed position; said lug and shoulder being located on the diametrically opposite side from the under opening and rear-end lug and at a point forward of the shell ejecting opening.

6. In a gun comprising a frame, a non-recoiling barrel, a recoiling breech-member having breech-locking means; means for causing counter-recoiling movement of the barrel on the frame when unlocking from the breech, said means comprising an interengaging lug and seat on the barrel and frame respectively, the abutting faces of which are in a plane inclined to the axis of the barrel.

7. In a gun comprising a frame, a non-recoiling barrel, a recoiling breech-member having breech-locking means; means for sustaining the barrel against recoil on the frame comprising an interengaging lug and seat, the abutting faces of which are in a plane inclined to the axis of the barrel, the direction of inclination causing counter recoil movement in the barrel when rotating to unlock.

8. In a gun comprising a frame, a non-recoiling barrel, a recoiling breech-member, and rotary unlocking breech-locking means; means securing the barrel to the frame comprising the undercut seat on one of said parts and the lug on the other of said parts extending into the seat and having an angular extension engaging in the undercut thereof.

9. In a gun having a barrel constructed with a cartridge chamber, a sight member, an extractor having a protruding end adapted to indicate the presence of a cartridge in said chamber, and a resilient member connecting the sight member and extractor.

10. In a gun having a barrel and a breech bolt constructed of a shell and a plug fitting said shell, and a sight member having a resilient arm, an extractor carried by said arm and constructed with a cartridge indicator; the sight member being introduced through a perforation in the shell of the breech bolt, and held therein by the breech bolt plug, and holding the extractor in operative position, with the cartridge indicator in line with the sight.

11. In a gun, the combination of a reciprocating breech member, a sear, a sear lock carried by the reciprocating breech member, of a safety slide mounted upon a fixed part of the gun in position to control the sear lock when the breech is closed; said sear lock and safety slide moving into and out of engagement by the reciprocating movement of the breech.

12. In a gun, the combination of a reciprocating breech-member, a sear, a sear lock carried by the reciprocating breech-member, of a safety slide mounted upon a fixed part of the gun in position to control the sear lock when the breech is closed; said sear lock and safety slide moving into and out of engagement by the reciprocating movement of the breech, and being constructed to engage by inclined faces whereby, on closing the breech, the sear lock is returned to the position determined by the safety slide.

13. In a gun, the combination of the breech-member reciprocating to open and close the breech, a sear, a pivoted sear lock mounted in the breech-member, and the safety slide having a substantially vertical movement upon a fixed part of the gun, engaging one end of the sear lock and rocking the latter upon its fulcrum to determine its position relatively to the sear.

14. In a gun, the combination of a sear, a sear lock, a safety slide controlling the position of the sear lock, and a grip lever having connection with the safety slide and moving it to a position which withdraws the sear lock when the gun is gripped for firing.

15. In a gun, the combination of a breech-bolt, a sear, a sear lock, and a breech bolt lock engaging the sear lock and holding the latter in position to prevent the release of the sear.

16. In a gun, the combination of a frame, a breech bolt reciprocating on the frame, a cocking lever carried by the breech bolt, a sear, a pivoted sear lock having one end moving into and out of position to dog the sear; and a sear lock controller having a part in engagement with the free end of the sear lock, and a part in engagement with the cocking lever of the breech bolt.

17. In a gun, the combination of the grip, the sear, the sear lock, the safety slide constructed to move the sear lock out of dogging relation with the sear, the grip lever for withdrawing the safety slide, and a means normally preventing movement of said slide the sear lock, and the grip lever.

18. In a gun, the combination with a sear, a sear lock, a safety slide for withdrawing the sear lock, means for manually moving the safety slide in the direction to withdraw the sear lock, and means normally acting to automatically move the safety slide in a direction to shift the sear lock into locking position.

19. In a gun, the combination of the sear, the firing device controlled by said sear, the sear lock for opposing movement of the sear, and the safety slide controlling the position of the sear lock and also engaging the firing device to prevent movement of the latter in the direction of cocking.

20. In a gun, the combination of the frame, the intermediately pivoted cocking lever a slide moving into the path of one end of the cocking lever to prevent the latter being moved in the direction of cocking, and means operating to disconnect said engagement when the gun is gripped for firing.

21. In a gun, the combination of the frame, the intermediately pivoted cocking lever, and a slide moving into the path of one end of the cocking lever to prevent the latter being moved in the direction of cocking, said slide having means automatically moving it into the path of the cocking lever, and means operating to automatically disconnect said engagement when the gun is gripped for firing.

22. In a gun, the combination of the frame, a breech-member reciprocating to open and close the breech, a slide mounted upon the frame and moving into the path of the breech-member to prevent opening of the latter, and means operating to automatically permit of such opening movement when the gun is gripped for firing.

23. In a gun, the combination of the frame, the breech-member reciprocating on the frame, a sear, a sear lock carried by the breech member, a safety slide carried by the frame and engaging with the sear lock when the breech is closed to control the position of the sear lock; said slide also moving into the path of the breech-member to prevent opening of the latter.

The foregoing specification signed at New York, N. Y., this 9th day of February, 1909.

ELBERT HAMILTON SEARLE.

In presence of—
    LAURA E. MONK,
    HARRY ETINGER.